UNITED STATES PATENT OFFICE.

RICHARD F. RUSSELL, OF JERSEY CITY, NEW JERSEY, ASSIGNOR TO AIR REDUCTION COMPANY, INC., A CORPORATION OF NEW YORK.

WELDING-ROD.

1,352,534.

Specification of Letters Patent.   Patented Sept. 14, 1920.

No Drawing.   Application filed June 24, 1919.   Serial No. 306,452.

*To all whom it may concern:*

Be it known that I, RICHARD F. RUSSELL, a citizen of the United States, residing at Jersey City, in the county of Hudson, State of New Jersey, have invented certain new and useful Improvements in Welding-Rods; and I do hereby declare the following to be a full, clear, and exact description of the invention, such as will enable others skilled in the art to which it appertains to make and use the same.

This invention relates to rod employed in electric and gas welding operations and has for its object the provision of a material adapted to improve the character of the welds produced, by removing deleterious nitrids and oxids, which are normally deposited in the weld, in carrying out the usual operations employing welding rod of the character now commonly known.

It has been demonstrated, heretofore, that oxids and nitrids, accumulating in the molten metal produced in normal welding operations by either electric or gas processes, become more or less segregated, as the molten metal cools, along the grain boundaries. The segregation and accumulation of oxids and nitrids is generally medially disposed in the weld, which is accordingly relatively weak and readily gives way upon the application of force to the work. Practical tests have demonstrated that the fracture in a weld always occurs along the grain boundaries, which are filled with oxids and nitrids.

To successfully overcome this difficulty, by preventing the formation of the deleterious oxids and nitrids, I propose to employ an agent which will combine with and eliminate the oxygen and nitrogen in the weld. The material best adapted for this purpose is zirconium although other metals of the rare earth group may be employed. My invention is capable of simple and satisfactory application, by employing a welding rod having a proportion of zirconium as a component of its composition.

Obviously the composition of the welding rod may vary widely. It is a fundamental rule, in carrying out welding operations, to employ a welding rod approaching as closely as possible in composition the material with which the metal of the rod is combined in making the weld. Thus, welding rod is available having compositions approaching those commonly characteristic of various irons and steels which are met in commercial practice.

It is to be understood, therefore, that in reciting hereafter certain definite compositions for welding rods, I am not thereby limited to the particular compositions stated. I have discovered that the addition of relatively small amounts of zirconium, for example, from 0.10% to 5.0%, to metal which otherwise corresponds closely to the composition of commercial welding rods, I am enabled to successfully eliminate oxids and nitrids from the welds, produced by utilizing the new material in either the electric or gas welding processes. My invention, therefore, broadly contemplates the addition, to a welding rod of otherwise normal composition, of relatively small amounts of a rare earth metal, preferably zirconium. As little as 0.10% may be sufficient under certain conditions and 5.0% of zirconium in a welding rod is entirely sufficient to accomplish the desired results under any conditions, with which I am at present familiar.

As an example of a welding rod for use with cast iron, the following composition may be employed:

| | |
|---|---|
| Silicon | 2.90 to 3.10%. |
| Phosphorus | Less than .90%. |
| Sulfur | Less than .09%. |
| Manganese | Less than .55%. |
| Combined carbon | Less than .35%. |
| Zirconium | 0.10 to 5.0%. |

A nickel steel welding rod adapted for use with the oxy-acetylene blowpipe may have a composition as follows:

| | |
|---|---|
| Carbon | .15 to .25% (.15% preferred). |
| Manganese | .50 to .80%. |
| Phosphorus | Less than .04%. |
| Sulfur | Less than .04%. |
| Nickel | 3.25 to 3.75% (3.50% preferred). |
| Silicon | Less than .08%. |
| Zirconium | 0.10 to 5.0%. |

A mild carbon steel rod adapted for use in electric welding operations may have a composition as follows:

| | | |
|---|---|---|
| Carbon | Not over | .18% |
| Manganese | Not over | .55% |
| Phosphorus | Not over | .05% |
| Sulfur | Not over | .05% |
| Silicon | Not over | .08% |
| Zirconium | 0.10 to 5.0% | |

These various alloys, and others which may be effectively employed in carrying out my invention, may be readily produced by introducing ferro-zirconium into a molten bath of metal having the desired characteristic composition. Ferro-zirconium is readily available in the market and varies in composition from 40 to 90% zirconium, the balance of the composition being substantially iron or metals of the iron group.

In addition to the desirability of the zirconium in preventing the formation of deleterious oxids and nitrids, alloys containing it have an additional advantage when employed as welding rod, in that metal containing zirconium is malleable and imparts a high tensile strength to the weld. The effect of zirconium is, therefore, cumulative in that the strength of the weld is increased, both by the scavenging effect of the zirconium, and by imparting to the metal the characteristic increased tensile strength of a zirconium alloy.

The methods of employing the rod are well understood and need not here be described in detail. It is sufficient for the purposes to indicate that the welding rod is melted by the heat of the electric arc or by a gas flame, such as the oxy-acetylene flame, and that the melted metal is manipulated to produce a weld between the separated parts of the work. The details of the welding operation form no part of the present invention which rests, as above indicated, in the discovery of the advantage of employing zirconium as a component in the composition of welding rod.

From the foregoing it will be readily understood that I have devised a novel welding rod having marked advantages over corresponding material now available and adapted to be produced in an economical and satisfactory manner so that it may become readily available in the commercial practice of the art. Various changes may be made in the compositions as hereinbefore noted without departing from the invention or sacrificing any of the advantages.

I claim:—

1. A welding rod having iron as its principal component and containing a rare earth metal as a scavenging agent to prevent formation of deleterious oxids and nitrids when the rod is melted to form a weld.

2. A welding rod having iron as its principal component and containing zirconium as a scavenging agent to prevent formation of deleterious oxids and nitrids when the rod is melted to form a weld.

3. A welding rod having iron as its principal component and containing from 0.10% to 5.0% of zirconium as a scavenging agent to prevent formation of deleterious oxids and nitrids when the rod is melted to form a weld.

4. A welding rod consisting of iron and the usual impurities present in commercial grades of steel together with a rare earth metal as a scavenging agent to prevent formation of deleterious oxids and nitrids when the rod is melted to form a weld.

5. A welding rod consisting of iron and the usual impurities present in commercial grades of steel together with zirconium as a scavenging agent to prevent formation of deleterious oxids and nitrids when the rod is melted to form a weld.

6. A welding rod consisting of iron and the usual impurities present in commercial grades of steel, together with zirconium in proportions ranging from 0.10% to 5.0%, the zirconium acting as a scavenging agent to prevent formation of deleterious oxids and nitrids when the rod is melted to form a weld.

In testimony whereof I affix my signature.

RICHARD F. RUSSELL.